Aug. 28, 1928.
J. G. LAMBERT
1,682,384
COOKING DEVICE
Filed Feb. 1, 1928    2 Sheets-Sheet 1
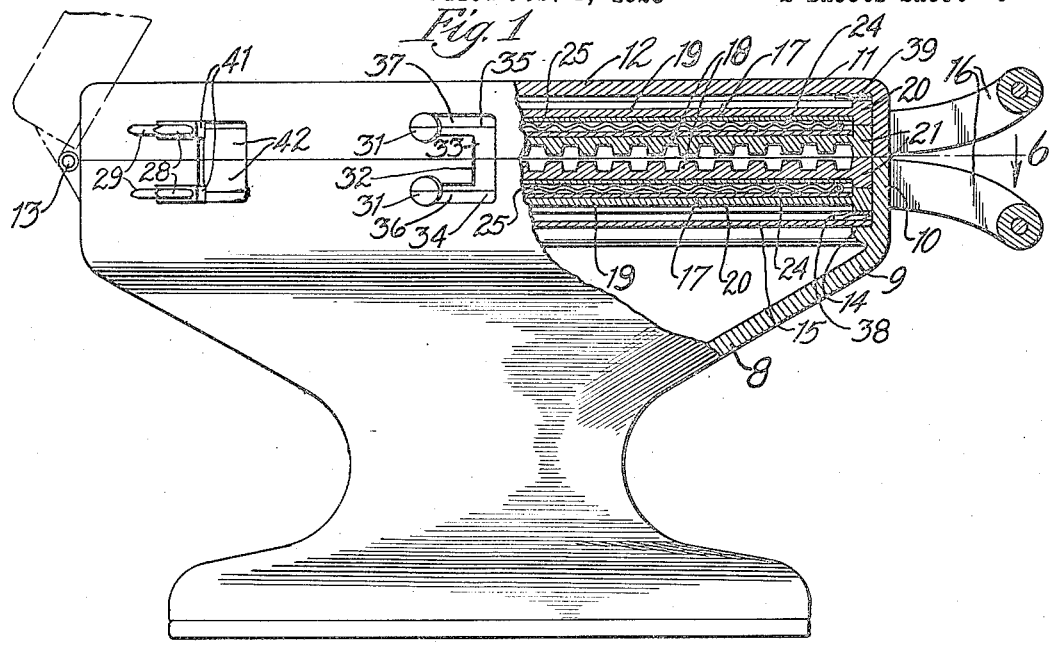
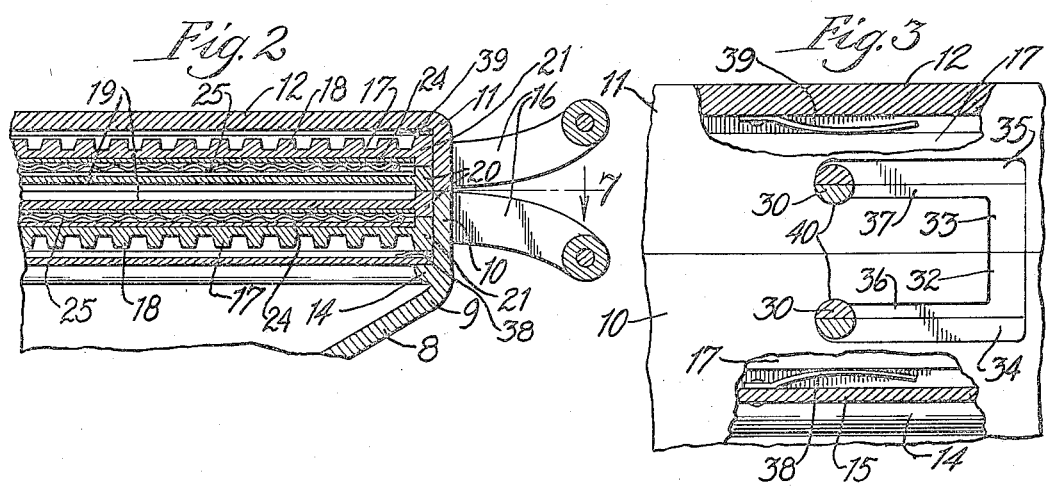
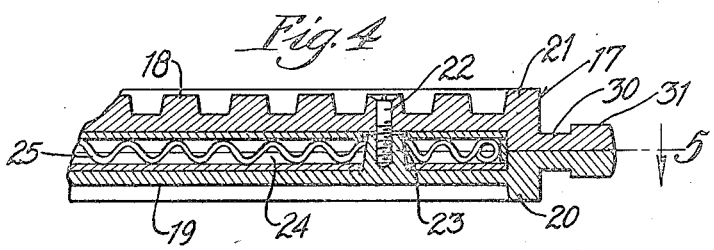
Inventor:
Joseph G. Lambert,
By Dyrenforth, Lee, Chritton & Wiles,
Attys.

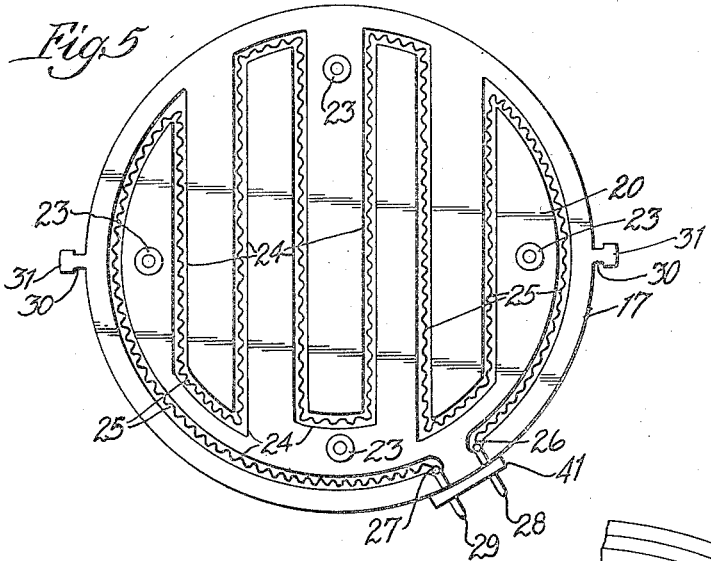
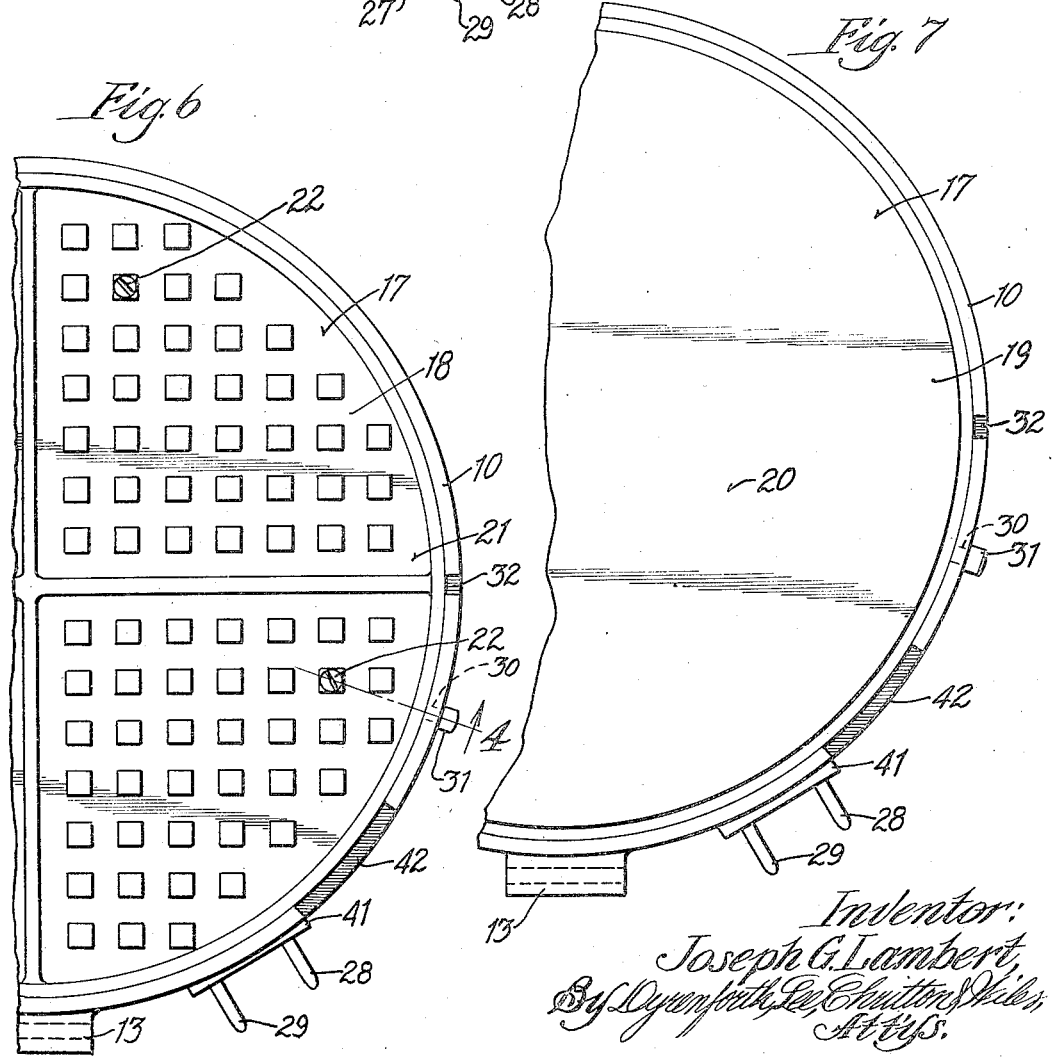

Patented Aug. 28, 1928.

1,682,384

UNITED STATES PATENT OFFICE.

JOSEPH G. LAMBERT, OF CHICAGO, ILLINOIS.

COOKING DEVICE.

Application filed February 1, 1928. Serial No. 251,181.

My invention relates more particularly to cooking devices, as for example, and more particularly, of the electrical type, comprising heated plate-like members for receiving therebetween the batter from which the article of food, as for example waffles, is to be made.

My primary object is to provide a cooking device of the general character above stated which shall be adapted for the making of articles having grid-like faces, as in the case of waffles, and also articles having smooth faces as in the case of pancakes.

Another object is to provide a device having the adaptabilities just stated which shall be of simple and economical construction and which may be readily conditioned for producing the different kinds of articles as above referred to.

Another object is to provide such a device of the electric type and of such construction that it may be used, for the making of either kind of articles referred to, with the current-conducting cords as commonly provided and in use; and other objects as will be manifest from the following description.

Referring to the accompanying drawings:—

Figure 1 is a view inside elevation of a cooking device constructed in accordance with my invention, certain portions thereof being broken away and sectioned to disclose details of parts of the structure, the parts being shown in position for the making of waffles. Figure 2 is a view in sectional elevation of a portion of the device of Fig. 1 showing the latter conditioned for the making of pancakes. Figure 3 is a broken view in side elevation of the central portion of the device of Fig. 1 with certain parts broken away and others shown in section. Figure 4 is an enlarged broken sectional view of one of the similar plate-like heat-radiating elements of the device of the preceding figures, the section being taken at the line 4 on Fig. 6 and viewed in the direction of the arrow. Figure 5 is a plan sectional view taken at the line 5 on Fig. 4 and viewed in the direction of the arrow. Figure 6 is a broken plan view taken at the line 6 on Fig. 1 and viewed in the direction of the arrow; and Figure 7, a similar view taken at the line 7 on Fig. 2 and viewed in the direction of the arrow.

Referring to the particular illustrated embodiment of my invention, the device comprises a hollow body 8 shown as of a form as commonly provided in electric waffle irons and comprising a main lower casing portion 9 terminating at its upper end in a short cylindrical portion 10, and a separate top section 11 forming a continuation of the cylindrical portion 10 and closed at its top as represented at 12, the section 12 being hingedly connected with the section 9 beyond the joint therebetween as represented at 13. The section 9 is provided internally with an inwardly projecting annular flange 14 forming a seat for a bottom-forming disk 15; and each section 9 and 11 is provided, in accordance with common practice, with a handle 16, both handles diametrically opposing the hinge 13.

The device also comprises a pair of plate-like elements 17 of the same construction, these elements in the particular construction shown being each equipped with electric heating elements adapted to be connected with any suitable source of current supply for supplying the heat for cooking. The elements 17 are so constructed that when positioned in the casing of the device they present spaced-apart portions at their opposed faces to receive the batter from which the article to be produced, is made.

Each element 17 at one face thereof is of grid-like form as represented at 18 as for example as in the case of electric waffle irons as commonly provided; and its opposite face is plain as represented at 19, the grid surface 18 and the plain surface 19 being slightly inwardly offset from the marginal face portions of the elements 17 whereby when the elements 17 are positioned to present their grid-like faces 18 in opposed relation as shown in Fig. 1, the device is adapted for the making of waffles and when these elements are so positioned that their plain offset surfaces 19 oppose each other, as shown in Fig. 2, the device is adapted for the making of pancakes.

Referring now to the particular construction of the elements 17, each is formed of two plate-like circular sections 20 and 21 which fit flatwise together and are held in this position as by screws 22 passing through the section 21 and screwing into studs 23 provided on the section 20, the opposing faces of the sections 20 and 21 being channeled as for example as represented more particularly in Figs. 2, 4 and 5 and shown at 24, for receiving an electrical resistance heating element 25 the terminals of which are represented at 26 and 27, these terminals being connected with contacts 28 and 29, respectively. Each element 17 is provided with diametrically opposed studs 30 projecting radially therefrom and headed at their outer extremities as represented at 31, each stud 30 being fromed of sections integral with the sections 20 and 21, as shown.

The studs 30, provided for cooperation with the casing sections 9 and 11 to hold the plate members 17 against accidental displacement therein, are adapted to be entered into the vertical portions 32 and 33 of slots 34 and 35 of angle shape and provided in the casing sections 9 and 11 and enter the horizontal portions 36 and 37 of these slots, respectively, upon rotating the elements 17, it being understood that the side of the casing opposite that shown in Fig. 1 is also provided with the slots as stated but with the horizontal portions 36 and 37 thereof extending to the right in Fig. 1.

The plate 15 is provided on its upper face, at its marginal edge, with a series of springs 38 which are engaged by the lowermost element 17 and are placed in tension when the studs 30 enter the horizontal portions 13 of the slots 34; and the underside of the cover plate 12 is also provided with a series of springs at its marginal edge which are represented at 39 and are engaged by the upper element 17 and placed under tension when the studs 30 of this element enter the horizontal portions 37 of the slots 35. To prevent accidental rotation of the elements 17 out of the position shown, the lower walls of the portions 37 of the slots 35 and the upper walls of the horizontal portions 36 of the slots 34 are recessed as indicated at 40 to receive the studs 30, which latter are held therein by the action of the springs referred to.

The terminals 28 and 29, which are mounted in a block 41, are so located as shown, that they extend at a point closely adjacent to the hinge 13, both the upper and lower sections of the casing containing slots 42 of the same general form as the slots 34 and 35 to accommodate the blocks 41.

Assuming that the elements 17 are assembled as shown in Fig. 1 for the making of waffles, the device is conditioned for making pancakes by interchanging the two plate-like elements 17 and reversing them to the position shown in Fig. 2. The reversing of these elements causes the device to present the recess to receive the batter from which the pancakes are to be made, and the interchanging of the elements 17 ensures the registration of the blocks 41 with the slots 42, this feature being of importance as duplex contact sockets of electric current lines as commonly provided for connection with electric waffles irons and the like, are adapted for connection with plural sets of contacts only when these contacts are close together as shown in Fig. 1.

While I have illustrated and described a particular construction embodying my invention I do not wish to be understood as intending to limit it thereto as the same may be variously modified and altered without departing from the spirit of my invention.

What I claim as new, and desire to secure by Letters Patent, is:

1. A combined pancake and waffle making device comprising separable upper and lower members and heat-radiating plate-like elements on said members each having one face in the form of a grid and its opposite face plain, said members being reversible, for the purpose set forth, and electric heating elements on each of said first-named elements.

2. A pancake and waffle making device comprising separable upper and lower members and electric-heating-element-equipped plate-like elements on said members each having one face in the form of a grid and its opposite face plain, said elements being reversible and interchangeable, for the purpose set forth.

3. A pancake and waffle making device comprising separable upper and lower members and electric-heating element-equipped plate-like elements on said members each having one face in the form of a grid and its opposite face plain, said elements having electric terminals, and means for releasably engaging said elements with said members, said terminals being located to one side of said means and said elements being reversible and interchangeable whereby said terminals in the different positions of said elements extend at the same locations on said members.

4. A pancake and waffle making device comprising separable upper and lower members and electric-heating-element-equipped plate-like elements on said members each having one face in the form of a grid and its opposite face plain, said elements having electric terminals, and means formed of interlocking portions on said members and elements, for releasably engaging said elements with said members, said terminals being located to one side of said means and said elements being reversible and interchangeable whereby said terminals in the different positions of said elements extend at the same locations on said members.

5. A pancake and waffle making device comprising upper and lower members hingedly connected together and electric-heating-element-equipped plate-like elements on said members each having one face in the form of a grid and its opposite face plain, said elements having electric terminals, and means for releasably engaging said elements with said members, said terminals being located adjacent said hinge and said elements being reversible and interchangeable whereby said terminals in the different positions of said elements extend at the same location on said members.

6. A pancake and waffle making device comprising upper and lower members hingedly connected together and electric-heating-element-equipped plate-like elements on said members each having one face in the form of a grid and its opposite face plain, said elements having electric terminals, and means formed of interlocking portions on said members and elements, for releasably engaging said elements with said members, said terminals being located adjacent said hinge and said elements being reversible and interchangeable whereby said terminals in the different positions of said elements extend at the same location on said members.

7. A combined pancake and waffle making device comprising separable upper and lower members and heat-radiating plate-like elements on said members each having one face in the form of a grid and its opposite face plain, said members being reversible, for the purpose set forth, and electric heating elements on each of said first-named elements and located between said faces.

8. A pancake and waffle making device comprising separable upper and lower members, and electric-heating-element-equipped plate-like elements on said members each having one face in the form of a grid and its opposite face plain, said elements being reversible, for the purpose set forth.

JOSEPH G. LAMBERT.